United States Patent
Yoneda

(10) Patent No.: US 10,298,157 B2
(45) Date of Patent: May 21, 2019

(54) BRUSHLESS MOTOR AND ELECTRIC POWER STEERING APPARATUS

(71) Applicant: HONDA MOTOR CO., LTD., Tokyo (JP)

(72) Inventor: Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 511 days.

(21) Appl. No.: 14/882,677

(22) Filed: Oct. 14, 2015

(65) Prior Publication Data

US 2016/0111985 A1   Apr. 21, 2016

(30) Foreign Application Priority Data

Oct. 15, 2014  (JP) ................................ 2014-210944

(51) Int. Cl.
| | |
|---|---|
| H02P 6/08 | (2016.01) |
| H02P 6/16 | (2016.01) |
| H02K 11/21 | (2016.01) |
| H02K 11/24 | (2016.01) |
| B62D 5/04 | (2006.01) |
| H02K 11/00 | (2016.01) |

(52) U.S. Cl.
CPC .............. *H02P 6/08* (2013.01); *B62D 5/0463* (2013.01); *H02K 11/0021* (2013.01); *H02K 11/0042* (2013.01); *H02K 11/21* (2016.01); *H02K 11/24* (2016.01); *H02P 6/16* (2013.01)

(58) Field of Classification Search
CPC .. H02P 6/08; H02P 6/16; H02K 11/21; H02K 11/24; B62D 5/0463
USPC ........ 318/400.1, 400.38, 400.39, 400.4, 609, 318/432, 434; 310/68 B
See application file for complete search history.

(56) References Cited

U.S. PATENT DOCUMENTS

| | | | | |
|---|---|---|---|---|
| 4,760,315 A | * | 7/1988 | Nanae ....................... | H02P 6/14 318/400.2 |
| 5,210,474 A | * | 5/1993 | Oswald ..................... | H02P 6/08 318/400.09 |
| 6,940,239 B2 | * | 9/2005 | Iwanaga ................. | H02P 6/085 318/268 |

(Continued)

FOREIGN PATENT DOCUMENTS

| | | |
|---|---|---|
| JP | 10-136688 A | 5/1998 |
| JP | 11-5548 A | 1/1999 |

(Continued)

OTHER PUBLICATIONS

Office Action dated Jul. 26, 2016, issued in counterpart Japanese Patent Application No. 2014-210944, with English translation. (11 pages).

*Primary Examiner* — Joseph M Rocca
*Assistant Examiner* — Maurice L Williams
(74) *Attorney, Agent, or Firm* — Westerman, Hattori, Daniels & Adrian, LLP

(57) ABSTRACT

On the basis of an energization phase signal being output from a rotational phase sensor and changing its output at every predetermined rotational phase corresponding to a stepwise change (increase or decrease) in rotational phase, a motor controller switches a phase current passing through the corresponding phase coil, and changes the magnitude of the phase current passing through the corresponding phase coil such that an actual motor torque detected by a torque sensor coincides with a target motor torque.

11 Claims, 10 Drawing Sheets

(56) References Cited

U.S. PATENT DOCUMENTS

| | | | | |
|---|---|---|---|---|
| 7,477,034 B2* | 1/2009 | MacKay | | H02P 6/182 318/254.1 |
| 7,777,436 B2* | 8/2010 | Brown | | H02P 6/182 318/400.01 |
| 7,791,328 B2* | 9/2010 | Sheahan | | G01K 7/16 318/432 |
| 2003/0076060 A1* | 4/2003 | Colosky | | H02P 6/182 318/400.32 |
| 2003/0155880 A1* | 8/2003 | Iwanaga | | H02P 6/10 318/432 |
| 2004/0178757 A1* | 9/2004 | Petersen | | H02K 21/12 318/400.11 |
| 2006/0001392 A1* | 1/2006 | Ajima | | B62D 5/046 318/432 |
| 2006/0049703 A1* | 3/2006 | Hosono | | H02K 29/08 310/68 B |
| 2009/0039813 A1* | 2/2009 | Yamada | | H02P 29/68 318/434 |
| 2011/0187242 A1* | 8/2011 | Takeuchi | | H02K 21/02 310/68 B |
| 2011/0276230 A1* | 11/2011 | Heilig | | B62D 5/0484 701/42 |
| 2012/0032620 A1* | 2/2012 | Shimada | | H02P 21/0089 318/400.09 |
| 2012/0083922 A1* | 4/2012 | Kwak | | B62D 57/032 700/245 |
| 2012/0205187 A1* | 8/2012 | Izutani | | B62D 5/0481 180/446 |
| 2013/0200827 A1* | 8/2013 | Kezobo | | H02P 29/0241 318/400.21 |
| 2013/0218392 A1* | 8/2013 | Aizawa | | B60L 3/0023 701/22 |
| 2013/0245893 A1* | 9/2013 | Sprinzl | | B62D 5/0481 701/42 |
| 2013/0311027 A1* | 11/2013 | Toyota | | B60L 11/14 701/22 |
| 2014/0039771 A1* | 2/2014 | Mori | | F16D 41/105 701/67 |
| 2014/0221894 A1* | 8/2014 | Nagasaka | | A61H 3/00 602/23 |
| 2015/0032263 A1* | 1/2015 | Keyl | | B25J 19/0004 700/261 |
| 2015/0032353 A1* | 1/2015 | Ajiro | | B60T 7/042 701/70 |
| 2015/0214865 A1* | 7/2015 | Zhao | | H02K 5/04 700/276 |

FOREIGN PATENT DOCUMENTS

| | | |
|---|---|---|
| JP | 2000-209886 A | 7/2000 |
| JP | 2006-7931 A | 1/2006 |
| JP | 2009-264812 A | 11/2009 |
| JP | 2011-130583 A | 6/2011 |
| JP | 2014-141187 A | 8/2014 |

* cited by examiner

FIG. 3

| | U-V ENERGIZATION | U-W ENERGIZATION | V-W ENERGIZATION | V-U ENERGIZATION | W-U ENERGIZATION | W-V ENERGIZATION | WEIGHT |
|---|---|---|---|---|---|---|---|
| DETECTING ELEMENT 54a | POSITIVE: 1 | NEGATIVE: 0 | NEGATIVE: 0 | NEGATIVE: 0 | POSITIVE: 1 | POSITIVE: 1 | 1 |
| DETECTING ELEMENT 54b | POSITIVE: 1 | POSITIVE: 1 | POSITIVE: 1 | NEGATIVE: 0 | NEGATIVE: 0 | NEGATIVE: 0 | 2 |
| DETECTING ELEMENT 54c | NEGATIVE: 0 | NEGATIVE: 0 | POSITIVE: 1 | POSITIVE: 1 | POSITIVE: 1 | NEGATIVE: 0 | 4 |
| Sp: ENERGIZATION PHASE SIGNAL | 1(3) | 2(2) | 3(6) | 4(4) | 5(5) | 6(1) | (TOTAL) |
| θm [deg] | 60 | 120 | 180 | 240 | 300 | 360 | |

62

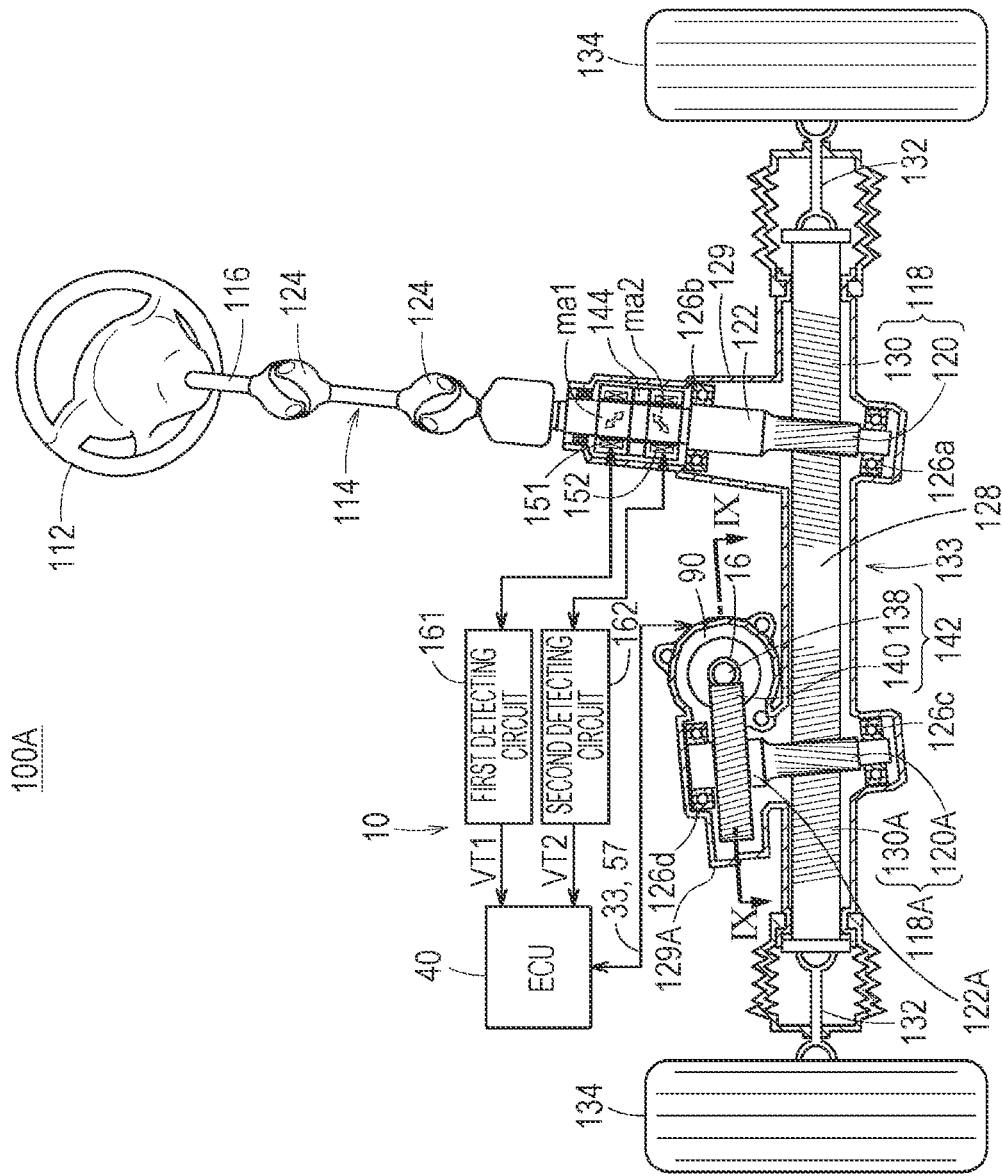

BRUSHLESS MOTOR AND ELECTRIC POWER STEERING APPARATUS

CROSS REFERENCES TO RELATED APPLICATIONS

The present application claims priority under 35 U.S.C. § 119 to Japanese Patent Application No. 2014-210944, filed Oct. 15, 2014, entitled "Brushless Motor and Electric Power Steering Apparatus." The contents of this application are incorporated herein by reference in their entirety.

TECHNICAL FIELD

The present disclosure relates to a brushless motor formed by a rotor having permanent magnets and a stator having field coils, and also relates to an electric power steering apparatus including the brushless motor.

BACKGROUND

A technique of electric power steering (EPS) control is known. In this technique, EPS control is performed on the basis of an output signal (motor torque signal) from a torque sensor attached to a rotating shaft of an assist motor that assists the steering effort of the driver.

Japanese Unexamined Patent Application Publication No. 11-5548 discloses an electric power steering apparatus that includes a speed reducing mechanism, in which a pinion gear mounted on a rotating shaft of an assist motor engages with a hypoid gear mounted on a steering shaft.

In this electric power steering apparatus, changes in the torque of the assist motor cause changes in backlash in the engaging part of the speed reducing mechanism (see, paragraph [0033] in Japanese Unexamined Patent Application Publication No. 11-5548).

Japanese Unexamined Patent Application Publication No. 11-5548 states that it is possible to compensate for the changes in backlash by varying the voltage applied to a piezoelectric collar that regulates the degree of engagement between the hypoid gear and the pinion gear, in accordance with changes in output signal (motor torque signal) from a torque sensor attached to the rotating shaft of the assist motor (see, paragraphs [0021], [0034] to [0037] in Japanese Unexamined Patent Application Publication No. 11-5548).

However, Japanese Unexamined Patent Application Publication No. 11-5548 does not specifically describe electrical and mechanical configurations of the torque sensor, and only states that the torque sensor is connected to an electronic control unit (ECU) (see, paragraph [0024] in Japanese Unexamined Patent Application Publication No. 11-5548).

Japanese Unexamined Patent Application Publication No. 2006-7931 discloses a technique in which the torque of an assist motor is controlled on the basis of a target motor torque signal and a torque sensor signal (actual motor torque signal) output from a magnetostrictive torque sensor attached to a rotating shaft of the assist motor (see, paragraphs [0018], [0019], [0022] to [0025] in Japanese Unexamined Patent Application Publication No. 2006-7931).

Japanese Unexamined Patent Application Publication No. 2009-264812 discloses a more detailed configuration of the magnetostrictive torque sensor.

Japanese Unexamined Patent Application Publication No. 2006-7931 does not specifically describe calculation and control techniques used by a motor current calculating unit that drives the assist motor equipped with the magnetostrictive torque sensor, but states that the assist motor includes a resolver serving as a rotational phase sensor (see, paragraph [0023] in Japanese Unexamined Patent Application Publication No. 2006-7931).

The technique disclosed in Japanese Unexamined Patent Application Publication No. 2006-7931 is assumed to provide a control configuration in which a minor loop includes vector control (current control) of related art which involves using a high-resolution resolver with a complex configuration to detect a continuous rotational phase (angle) that increases in increments of one degree (1°) or the like, and a major loop includes torque control which is provided outside the current control to stabilize the motor output.

In this case, the assist motor has a complex structure, because it requires a magnetic path for generating a magnetic flux density that varies sinusoidally for vector control. The control circuit and the control algorithm are also complex.

Generating a magnetic flux density that sinusoidally varies allows sinusoidal energization (sinusoidal drive) of a 180-degree energization type, and can prevent changes in motor torque. However, generating a magnetic flux density that sinusoidally varies requires an advanced and complex operation for designing a complex stator teeth shape, cross-sectional shape of permanent magnets, and polarization direction. Additionally, for passing an energization current for sinusoidal energization, vector control needs to be performed by an expensive high-speed microcomputer on the basis of an angle detected by an expensive high-resolution resolver.

SUMMARY

In view of the circumstances described above, the present application describes an inexpensive brushless motor which has a simple configuration, a simple control algorithm, and less variation in motor torque, and does not require either a current sensor for measuring phase currents of the brushless motor or vector control (current control). The present application also describes an electric power steering apparatus including the brushless motor.

A brushless motor according to one aspect of the present disclosure includes a rotor rotating integrally with a rotating shaft and having a plurality of permanent magnets circumferentially arranged to serve as magnetic poles, and a stator having a plurality of phase coils arranged to face the rotor with a gap therebetween. The brushless motor includes a rotational phase sensor configured to detect, as a rotational phase, a rotational position of a magnetic pole of one of the permanent magnets in accordance with the rotation of the rotor, and to generate an energization phase signal that changes an output thereof every predetermined rotational phase corresponding to a stepwise change (increase or decrease) in the rotational phase; a torque sensor attached to the rotating shaft and configured to detect an actual motor torque; and a motor controller configured to pass phase currents to the respective phase coils. On the basis of the energization phase signal that changes the output thereof every predetermined rotational phase, the motor controller switches a phase current passing through the corresponding phase coil from one to another, and changes the magnitude of the phase current passing through the corresponding phase coil such that the actual motor torque detected by the torque sensor coincides with a target motor torque.

Thus, a brushless motor can be provided, which is capable of reducing changes in motor torque with a simple and inexpensive configuration, without requiring an expensive phase current sensor for controlling the motor torque. Also, the brushless motor does not require a high-precision rotational phase sensor, such as a high-resolution resolver with a complex configuration which detects a continuous rotational phase (angle) that increases in increments of one degree. This can reduce the cost of the brushless motor and improve reliability of the brushless motor.

A rotational phase sensor that divides the frequency of a continuous rotational phase of a high-precision rotational phase sensor, such as a resolver, and generates an energization phase signal that changes its output every predetermined rotational phase, is also included in the present disclosure.

When the phase coils are three phase coils, a U-phase coil, a V-phase coil, and a W-phase coil, the rotational phase sensor is preferably configured to generate the energization phase signal that changes the output thereof every 60 degrees in electrical angle, which is the predetermined rotational phase. The motor controller preferably passes the phase current sequentially through pairs of phase coils, the U- and V-phase coils, the U- and W-phase coils, the V- and W-phase coils, the V- and U-phase coils, the W- and U-phase coils, and the W- and V-phase coils while changing the phase in each 120-degree energization range on the basis of the energization phase signal.

This simplifies the control operation and the circuit configuration of the control circuit.

A waveform showing changes in magnetic flux density of the permanent magnets during half a period, including the 120-degree energization range of each phase current, may be a substantially trapezoidal waveform with rounded corners, not a rectangular waveform or a sinusoidal waveform. In this case, the stator and the rotor do not require a complex configuration for generating sinusoidal or rectangular changes in magnetic flux density, and there is no need for detailed design for obtaining such a complex configuration. Therefore, the brushless motor can be manufactured in low cost and shorter development time.

The torque sensor may be formed by a magnetostrictive torque sensor. In this case, it is possible to improve torsional rigidity of a drive system including the rotating shaft, make the drive system less prone to torsional resonance, and extend the frequency response of drive control to high frequencies.

The rotational phase sensor may include a rotating member configured to rotate integrally with the rotating shaft, the rotating member including a plurality of sensor permanent magnets circumferentially arranged to correspond to respective positions of the magnetic poles; and a magnetic detector secured in place to face the rotating member, the magnetic detector being configured to detect changes in rotation of the sensor permanent magnets of the rotating member. The rotational phase sensor with a simple configuration can thus be provided.

The rotational phase sensor may include a Hall element sensor or a magnetoresistive element sensor. This eliminates the need for an expensive, high-precision rotational angle sensor with a complex configuration, such as a magnetic resolver or an optical rotary encoder.

In the case of adopting two-phase energization in which two out of three phase coils are energized in each 120-degree energization range, either the Hall element sensor or the magnetoresistive element sensor can detect the rotational phase with a sufficiently high precision.

An electric power steering apparatus including the brushless motor described above is also included in the present disclosure. The electric power steering apparatus achieves simple drive control, low cost, and high performance.

The present disclosure provides an inexpensive brushless motor which has a simple configuration, a simple control algorithm, and less variation in motor torque, and does not require either a current sensor for measuring phase currents of the brushless motor or vector control (current control). The present disclosure also provides an electric power steering apparatus including the brushless motor.

BRIEF DESCRIPTION OF THE DRAWINGS

The advantages of the disclosure will become apparent in the following description taken in conjunction with the following drawings.

FIG. 3 is an operation explanation table explaining an operation of a rotational phase sensor.

FIG. 10 schematically illustrates a configuration of an electric power steering apparatus obtained by modifying the electric power steering apparatus of the second embodiment.

DETAILED DESCRIPTION

Embodiments of the present disclosure will now be described with reference to the drawings.

First Embodiment

Figure 1:
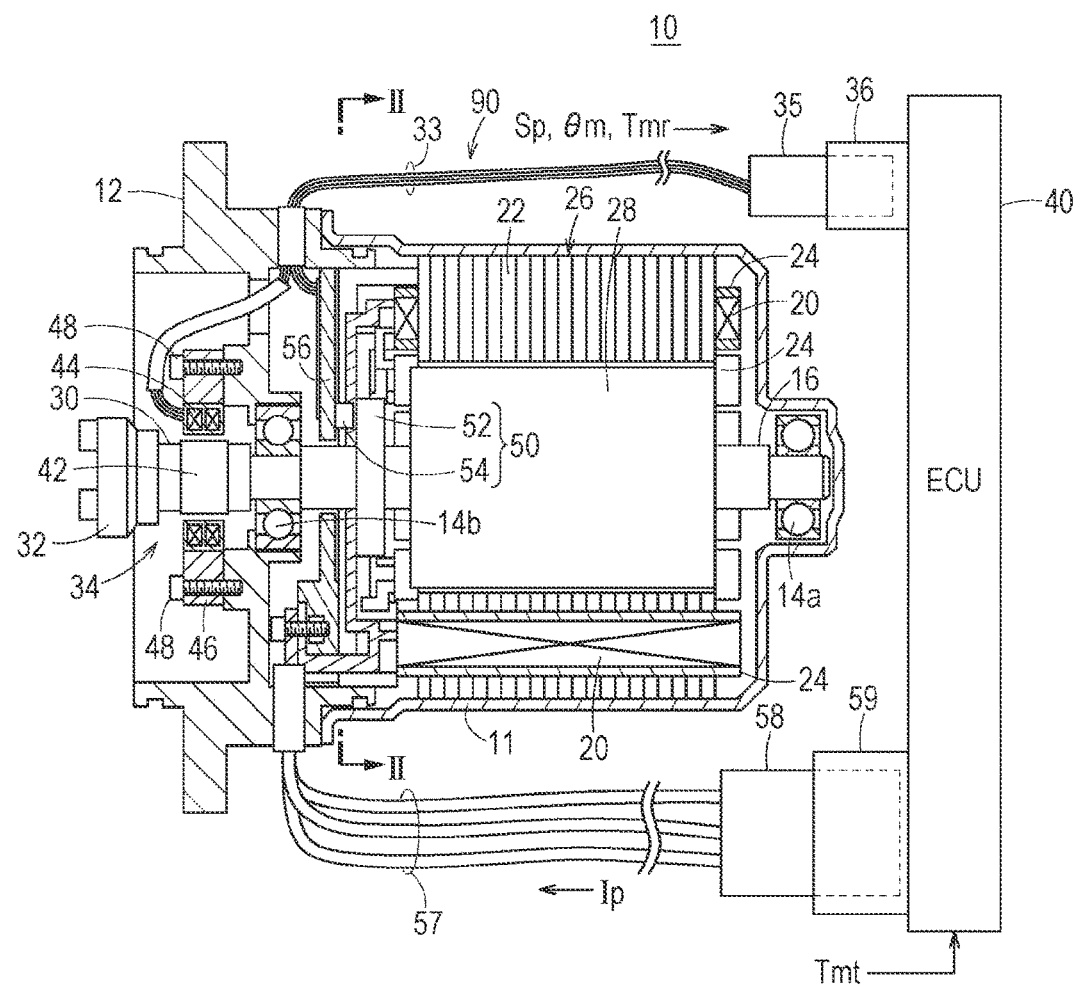
FIG. 1 is a partial cross-sectional front view of a brushless motor according to a first embodiment.

FIG. 1 is a partial cross-sectional front view of a configuration of a brushless motor 10 according to a first embodiment.

The brushless motor 10 includes a motor body (which may be simply referred to as a motor) 90, and an electronic control unit (ECU) 40 serving as a motor controller that controls the drive of the motor body 90. The ECU 40 is a calculator including a microcomputer. The ECU 40 includes a central processing unit (CPU); memories such as a read-only memory (ROM, including an electrically erasable programmable ROM (EEPROM)) and a random-access memory (RAM); input/output devices such as an analog-to-digital (A/D) converter and a digital-to-analog (D/A) converter; and a timer serving as a time measuring unit. The CPU reads and executes programs recorded in the ROM to function as various function implementing units, such as a control unit, a computing unit, and a processing unit. By this way, the CPU may perform functions described in the present application.

The motor body 90 includes a cup-like motor case 11 and a motor housing 12 coupled to an open end of the motor case 11. A pair of bearings 14a and 14b mounted on the motor case 11 and the motor housing 12, respectively, rotatably supports a rotating shaft 16.

The inner periphery of the motor case 11 supports a stator core (yoke and teeth) 22. Phase coils 20 (including a U-phase coil 20u, a V-phase coil 20v, and a W-phase coil 20w described below) each to be supplied with a phase current Ip (motor current) are wound on respective bobbins 24 passing through the stator core 22 in the axial direction to form a stator 26.

A rotor 28 is disposed inside the stator 26 to face the stator 26, with a gap therebetween. The rotor 28 includes a plurality of permanent magnets (not shown) serving as magnetic poles. The permanent magnets are arranged circumferentially and parallel to the rotating shaft 16. The rotor 28 rotates integrally with the rotating shaft 16.

The rotor 28 is configured such that a back yoke (not shown), the permanent magnets (not shown), and a permanent magnet cover are substantially concentrically arranged, in this order from the inner periphery of the rotor 28, around the rotating shaft 16.

In the brushless motor 10 of the present embodiment, the rotor 28 has six poles (three pole-pairs). In other words, a mechanical angle of 120 degrees of the rotor 28 corresponds to an electrical angle of 360 degrees of the rotor 28. The stator 26 is a stator with lap winding and includes 18 teeth. The stator 26 may be a six-pole, nine-slot stator with salient-pole winding.

As described above, the brushless motor 10 of the first embodiment is configured as a so-called inner-rotor brushless motor, in which the rotor 28 includes permanent magnets and the stator 26 includes the stator core (yoke and teeth) 22 and the phase coils 20. The technique of the present disclosure may be applied to an outer-rotor brushless motor.

The brushless motor 10 is used, for example, in an electric power steering apparatus 100 (described below). A torque (motor torque) generated on the rotating shaft 16 is transmitted to a speed reducer (described below), through a joint (coupling) 32 at an end portion of a joint shaft (coupling shaft) 30 inserted (or press-fitted and secured) into the rotating shaft 16.

As a torque sensor 34, a known magnetostrictive torque sensor that detects an actual motor torque Tmr of the brushless motor 10 is provided at the left end of the rotating shaft 16, from which the joint 32 protrudes from the motor housing 12.

The torque sensor 34 is provided with an anisotropy after a magnetostrictive film 42 is applied to the outer periphery of the joint shaft 30. A detecting coil 44 is disposed around the magnetostrictive film 42 on the outer periphery of the joint shaft 30. The detecting coil 44 is provided for detecting changes in magnetic permeability of the magnetostrictive film 42, which changes in accordance with the actual motor torque Tmr, as changes in impedance. A cylindrical mounting member 46 that holds the detecting coil 44 on its inner surface is secured to the motor housing 12 by screws 48.

The actual motor torque Tmr, which is a detection torque signal detected by the detecting coil 44 of the torque sensor 34, is transmitted through a sensor harness 33, a connector 35, and a connector 36, to the ECU 40 serving as a motor controller.

A conversion circuit or interface circuit (not shown) that converts the changes in impedance into the actual motor torque Tmr may be disposed either near the detecting coil 44 or in the ECU 40.

The rotating shaft 16 is provided with a sensor magnet 52 included in a rotational phase sensor 50. The rotational phase sensor 50 detects a rotational phase θm of the brushless motor 10, and outputs an energization phase signal Sp for determining the timing of energization of the phase coils 20.

A detector 54 that detects the rotational positions of the north and south magnetic poles of the sensor magnet 52 included in the rotational phase sensor 50 is mounted on a substrate 56 secured to the motor housing 12. The rotational phase sensor 50 includes an energization phase signal generating unit 51 (see FIG. 4) described below, as well as the sensor magnet 52 and the detector 54.

Figure 2:
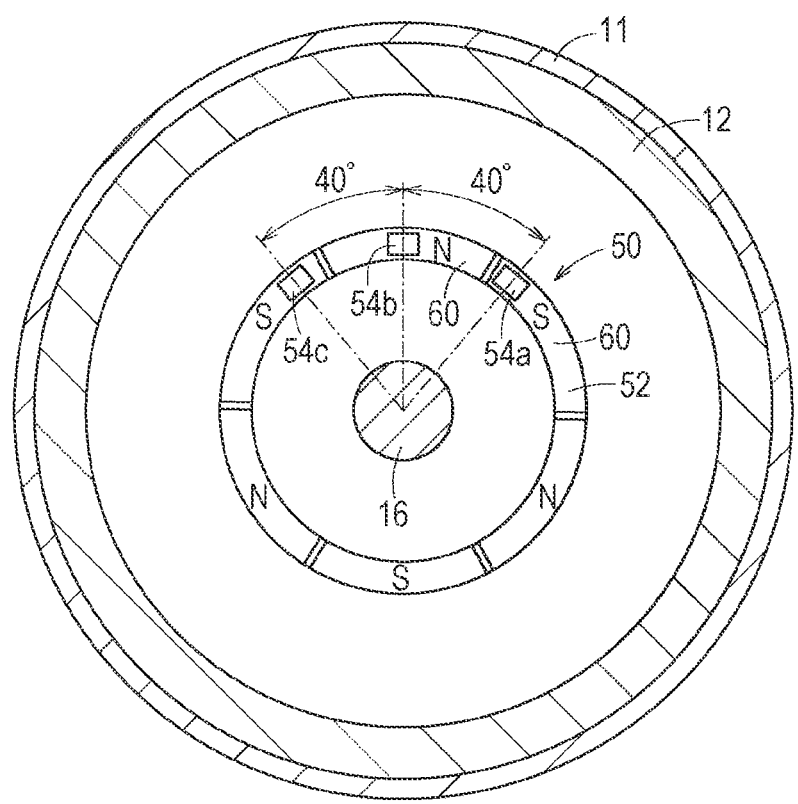
FIG. 2 is a partially omitted cross-sectional view taken along line II-II of the brushless motor illustrated in FIG. 1.

FIG. 2 is a partially omitted cross-sectional view taken along line II-II passing through the detector 54 of the brushless motor 10 illustrated in FIG. 1.

The sensor magnet 52, which is a rotating member (rotating plate) rotating together with the rotating shaft 16, has an annular member formed by sensor permanent magnets 60. The sensor permanent magnets 60 forming the north and south magnetic poles are circumferentially arranged to alternate every 60 degrees (=π/3 radians). That is, the sensor permanent magnets 60 for six poles (three pole-pairs) are provided.

The detector 54 serves as a magnetic detector that detects the rotational positions of the north and south poles of the sensor permanent magnets 60 forming the sensor magnet 52 included in the rotational phase sensor 50. The detector 54 includes three detecting elements 54a, 54b, and 54c, which are secured onto the substrate 56 (see FIG. 1) at respective positions 40 degrees apart in the circumferential direction. The detector 54 detects the rotational phase θm of the rotating shaft 16, that is, the rotational phase θm of the rotor 28 of the brushless motor 10.

The detecting elements 54a, 54b, and 54c are each formed, for example, by a Hall element or a magnetoresistive (MR) element. In the present embodiment, the detecting elements 54a, 54b, and 54c are each formed by a Hall element.

The rotational phase sensor 50 further includes, on the substrate 56, the energization phase signal generating unit 51 (see FIG. 4) that generates the energization phase signal Sp.

FIG. 3 is an operation explanation table 62 that explains the operation of the rotational phase sensor 50.

Figure 4:
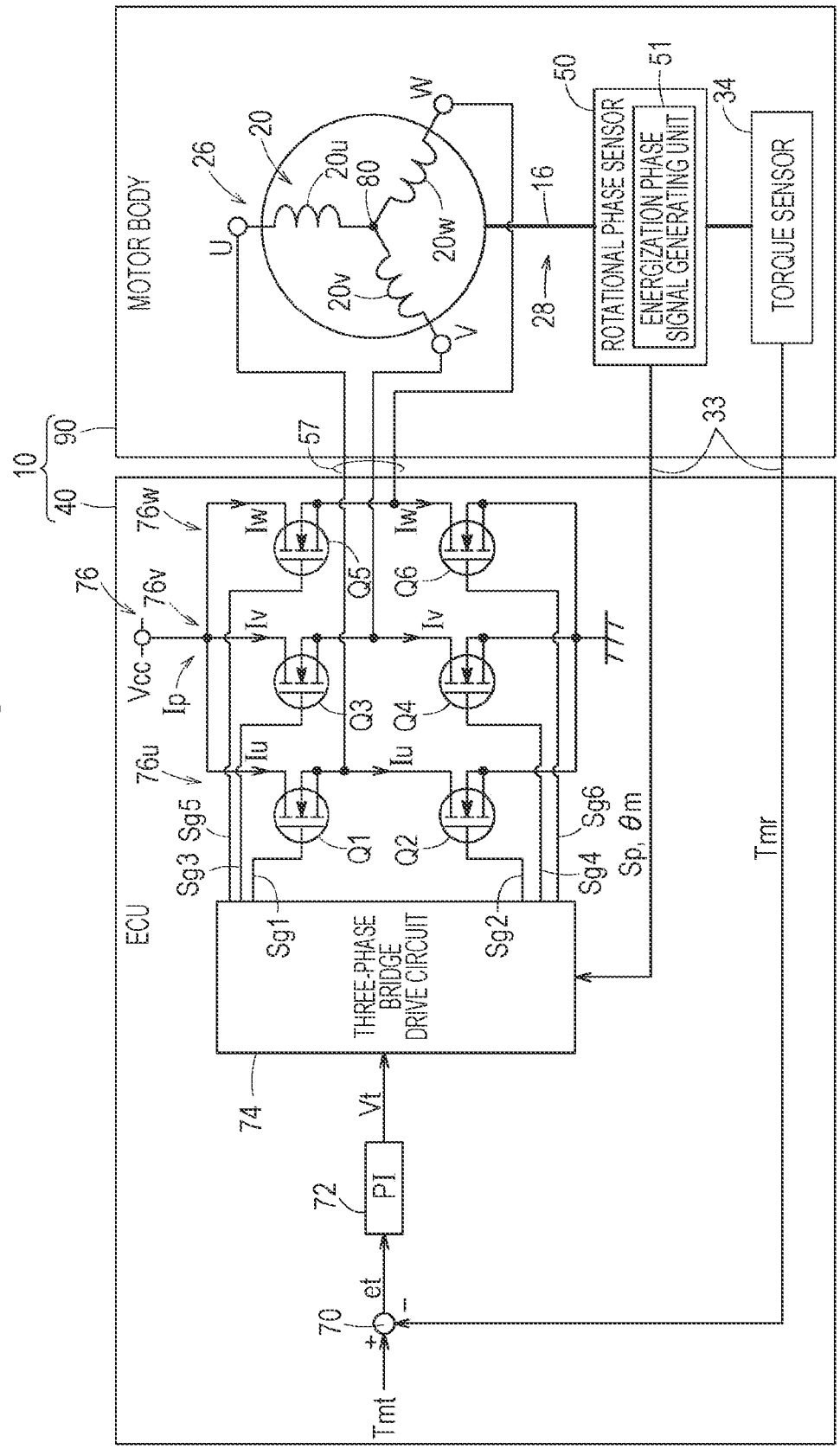
FIG. 4 is a circuit block diagram of the brushless motor according to the first embodiment, which includes a motor body and an ECU.

FIG. 4 is a circuit block diagram of the brushless motor 10 according to the first embodiment, which includes the motor body 90 and the ECU 40.

The rotational phase sensor 50 is for determining the timing of energizing the phase coils 20 (U-phase coil 20u, V-phase coil 20v, and W-phase coil 20w). Therefore, it is only necessary to separate the north and south poles of the sensor permanent magnets 60 of the sensor magnet 52. That is, it is only necessary that the output of each of the detecting elements 54a, 54b, and 54c of the rotational phase sensor 50 be a binary output. For example, when detecting the rotational position of one of the sensor permanent magnets 60, such as the rotational position of the north pole, the corresponding one of the detecting elements 54a, 54b, and 54c outputs a high level (Hi)=1 which is a positive value, whereas when detecting the rotational position of the south pole, the corresponding one of the detecting elements 54a, 54b, and 54c outputs a low level (Lo)=0 which is a negative value. The rotational phase sensor 50 does not need to be a high-resolution angular sensor, such as a resolver, with a resolution of about one degree.

In the example of FIG. 3, weights of 1, 2, and 4 are assigned to the outputs of the detecting elements 54a, 54b, and 54c, respectively. This allows the rotational phase sensor 50 to detect the rotational phase θm stepwise with a resolution of 60 degrees in electrical angle from the origin. That is, the rotational phase sensor 50 detects the rotational phase θm every 60 degrees in electrical angle (60, 120, 180, 240, 300, 360(0), 60, etc.) in a stepwise manner.

In practice, in the energization phase signal generating unit 51 of the rotational phase sensor 50, a signal with a positive or negative level detected by each of the detecting elements 54a, 54b, and 54c is converted, by a comparator (not shown), to a binary output signal which is either 1 (positive) or 0 (negative). Additionally, in the energization phase signal generating unit 51, the binary output signals are summed by a weight adder which assigns weights "1", "2", and "4" to the positive output values "1" of the detecting elements 54a, 54b, and 54c, respectively. Then, the results of the summing (total values), (3), (2), (6), (4), (5), and (1), are converted to values of 1, 2, 3, 4, 5, and 6, respectively, for convenience. This generates the energization phase signal Sp which uniformly changes its output every predetermined rotational phase corresponding to a 60-degree stepwise change (which is an increase here, but is a decrease in the case of reverse rotation) of the rotational phase θm, that is, every 60 degrees from the origin.

That is, since the values 1, 2, 3, 4, 5, and 6 of the energization phase signal Sp correspond to 60 degrees, 120 degrees, 180 degrees, 240 degrees, 300 degrees, and 360 (0) degrees, respectively, the energization phase signal Sp can be used as a timing signal for switching the phase current Ip from one to another.

The energization phase signal Sp may be generated on the substrate 56 and supplied through the sensor harness 33 to the ECU 40. Alternatively, the outputs of the detecting elements 54a, 54b, and 54c may be supplied through the sensor harness 33 to the ECU 40 to generate the energization phase signal Sp in the ECU 40. Note that the meaning of "U-V energization" and the like in the operation explanation table 62 in FIG. 3 will be described later on.

Although the brushless motor 10 illustrated in FIG. 1 includes the sensor magnet 52 which rotates integrally (together) with the rotating shaft 16, the brushless motor 10 does not necessarily need to include the sensor magnet 52. That is, the rotational phase sensor 50 may be formed by the rotor 28 which includes the north and south magnetic poles (permanent magnets) circumferentially arranged to alternate every 60 degrees, and the detector 54 (including the detecting elements 54a, 54b, and 54c) which detects changes in the magnetic pole of the rotor 28.

The rotational phase sensor 50 that detects the rotational phase θm stepwise and generates the energization phase signal Sp can be manufactured as a sensor with a simple configuration, even when it is an optical sensor, not a magnetic sensor.

In the brushless motor 10 configured as described above, the ECU 40 determines the magnitude of the phase current Ip such that the actual motor torque Tmr detected by the torque sensor 34 coincides with a target motor torque Tmt. The target motor torque Tmt is supplied from the outside to the ECU 40, or internally generated by the ECU 40 on the basis of the speed of a vehicle (not shown) and the axial torque and the steering angle of a steering shaft (described below). Then, on the basis of the rotational phase θm detected by the rotational phase sensor 50, that is, on the basis of the energization phase signal Sp, the timing of each phase currents Ip (Iu, Iv, or Iw) to be passed through the corresponding phase coil 20 is determined, and the timing-controlled phase current Ip (Iu, Iv, or Iw) is passed from the ECU 40, through a connector 59, a connector 58, and a three-phase harness 57 (see FIG. 1), to the corresponding phase coil 20 of the stator 26.

As described above, FIG. 4 is a circuit block diagram of the brushless motor 10 according to the first embodiment, which includes the motor body 90 and the ECU 40.

As illustrated in FIG. 4, the motor body 90 basically includes the stator 26 having the phase coils (three-phase coil) 20 formed by the U-phase coil 20u, the V-phase coil 20v, and the W-phase coil 20w; and the rotor 28 rotating integrally with the rotating shaft 16 provided with the torque sensor 34 and the rotational phase sensor 50 (including the sensor magnet 52).

The ECU 40 includes a subtracter 70, a proportional-integral (PI) control unit 72, a three-phase bridge drive circuit 74, and a three-phase bridge circuit 76.

The three-phase bridge circuit 76 includes a U-phase bridge circuit 76u, a V-phase bridge circuit 76v, and a W-phase bridge circuit 76w, each formed by a series circuit of an upper arm element and a lower arm element connected between a power supply Vcc and a ground (GND).

Upper arm elements Q1, Q3, and Q5 and lower arm elements Q2, Q4, and Q6 are each formed by a metal oxide semiconductor field-effect transistor (MOSFET), which is a semiconductor switching element. Gate drive signals Sg1 to Sg6 are supplied from the three-phase bridge drive circuit 74 to respective gate terminals which are ON/OFF control terminals of the upper arm elements Q1, Q3, and Q5 and lower arm elements Q2, Q4, and Q6.

The U-phase bridge circuit 76u is formed by the upper arm element Q1 and the lower arm element Q2, and a midpoint (node) between the upper arm element Q1 and the lower arm element Q2 is connected to one end of the U-phase coil 20u.

The V-phase bridge circuit 76v is formed by the upper arm element Q3 and the lower arm element Q4, and a midpoint (node) between the upper arm element Q3 and the lower arm element Q4 is connected to one end of the V-phase coil 20v.

The W-phase bridge circuit 76w is formed by the upper arm element Q5 and the lower arm element Q6, and a midpoint (node) between the upper arm element Q5 and the lower arm element Q6 is connected to one end of the W-phase coil 20w.

The other ends of the U-phase coil 20u, V-phase coil 20v, and W-phase coil 20w are connected in common to form a midpoint (node) 80.

In the brushless motor 10 configured as described above, the PI control unit 72 generates a motor drive signal Vt such that the actual motor torque Tmr detected by the torque sensor 34 coincides with the target motor torque Tmt supplied from the outside (e.g., another ECU) or generated by the ECU 40; in other words, such that an error (deviation) et (=Tmt−Tmr) calculated by the subtracter 70 is zero. The PI control unit 72 supplies the generated motor drive signal Vt to the three-phase bridge drive circuit 74.

At the same time, the energization phase signal Sp generated by the energization phase signal generating unit 51 of the rotational phase sensor 50 is input to the three-phase bridge drive circuit 74.

The three-phase bridge drive circuit 74 determines the timing of energizing each phase coil 20 of the stator 26.

That is, the three-phase bridge drive circuit 74 generates the gate drive signals Sg1 to Sg6 on the basis of the motor drive signal Vt and the energization phase signal Sp indicating the timing of energizing each phase coil 20 of the stator 26, drives the three-phase bridge circuit 76 through pulse-width modulation (PWM) using the gate drive signals Sg1 to Sg6, and passes the phase currents Ip (Iu, Iv, and Iw) to the respective phase coils 20.

A magnetostrictive torque sensor with a wide frequency range and a good frequency response is used as the torque sensor 34 that detects the actual motor torque Tmr, which is the axial torque of the rotating shaft 16 of the brushless motor 10. Therefore, it is possible to control responses with frequencies up to more than several hundred hertz (Hz) necessary for motor drive control.

Figure 5:
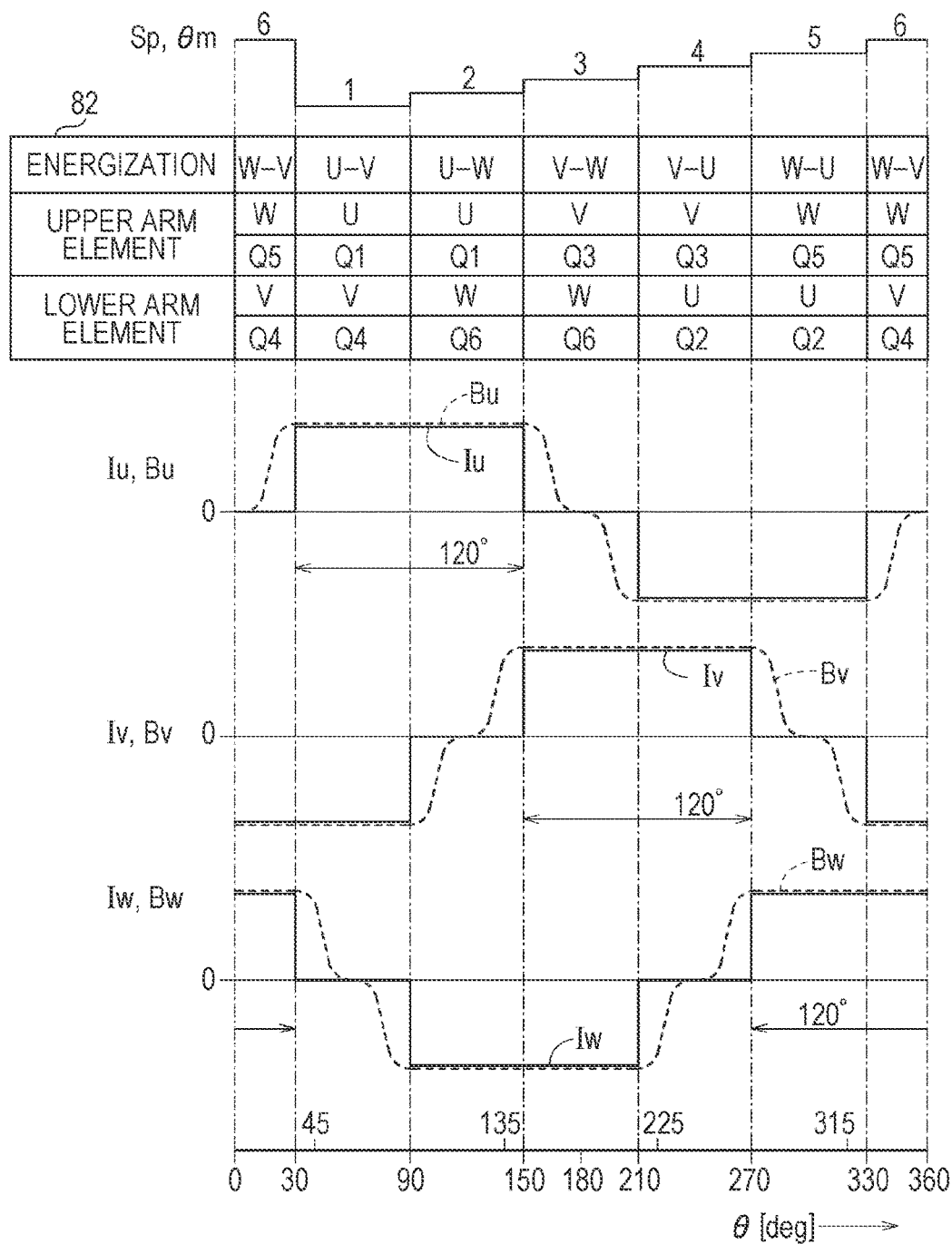
FIG. 5 is a timing diagram showing energization patterns of phase currents.

FIG. 5 is a timing diagram showing energization patterns of the phase currents Iu, Iv, and Iw.

The phase currents Iu, Iv, and Iw, each represented by a solid rectangular waveform, are passed through the corresponding upper arm elements Q1, Q3, and Q5 and lower arm elements Q2, Q4, and Q6 on the basis of the energization phase signal Sp (rotational phase θm) generated by the rotational phase sensor 50, in a 120-degree range in electrical angle θ, as shown in an energization timing table 82 (see also the operation explanation table 62 in FIG. 3).

The energization timing table 82 (operation explanation table 62) is provided so that, in accordance with the value (any one of 1 to 6) taken by the energization phase signal Sp, one of the upper arm elements Q1, Q3, and Q5 and one of the lower arm elements Q2, Q4, and Q6 are PWM-driven for 120-degree energization and the phase currents Ip pass through the corresponding two phase coils 20 connected in series. The energization timing table 82 (operation explanation table 62) is stored in a memory (storage unit, not shown) in the ECU 40 in advance, and is referred to by the three-phase bridge drive circuit 74.

Specifically, the 120-degree energization (energization intervals are 120 degrees) will be described by using, as an example, a U-W energization state (see FIGS. 3 and 5) where the value of the energization phase signal Sp is 2. For example, at the position where the electrical angle θ is 135 degrees, the gate drive signal Sg1 and the gate drive signal Sg6 bring only the upper arm element Q1 and the lower arm element Q6 to an energized state (ON state), and the U-phase current Iu flowing out of the power supply Vcc passes through the upper arm element Q1 to reach the midpoint 80 of the U-phase coil 20u. Then, from the midpoint 80, the W-phase current Iw flows into and out of the W-phase coil 20w and passes through the lower arm element Q6 to reach the ground.

That is, in the 120-degree energization, the phase currents Ip always flow through only two phase coils 20, in the order from a coil of one phase (U-phase coil 20u in this example) to a coil of another phase (W-phase coil 20w in this example).

In FIG. 5, waveforms indicated by broken lines represent magnetic flux densities of U-, V-, and W-phases (U-phase magnetic flux density Bu, V-phase magnetic flux density Bv, and W-phase magnetic flux density Bw) at a given rotational speed.

The waveforms of the magnetic flux densities Bu, Bv, and Bw and the waveforms of the phase currents Iu, Iv, and Iw are normalized to the same amplitude.

In this case, the waveform of each of the magnetic flux densities Bu, By, and Bw is not a sinusoidal waveform, and is a substantially trapezoidal waveform with rounded corners. The ECU 40 (or the CPU of the ECU 40) controls the magnitude of each of the phase currents Iu, Iv, and Iw such that the actual motor torque Tmr generated in proportion to the magnetic flux densities Bu, Bv, and Bw and detected by the torque sensor 34 coincides with the target motor torque Tmt. This eliminates the need for a current sensor that detects the phase currents Iu, Iv, and Iw of the U-, V-, and W-phases.

Figure 6:
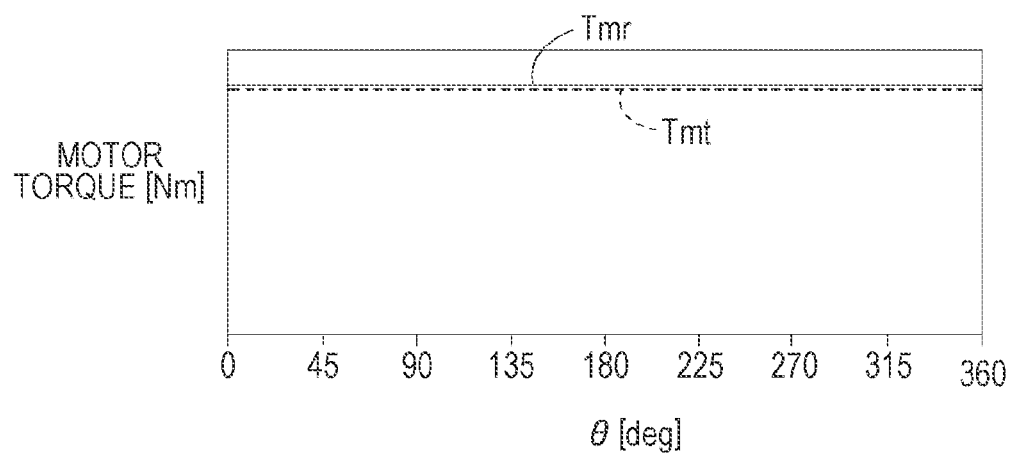
FIG. 6 is a waveform diagram showing motor torques.

FIG. 6 shows waveforms of motor torques.

As shown in FIG. 6, in the brushless motor 10 of the present embodiment, the actual motor torque Tmr indicated by a solid line is controlled to coincide with the target motor torque Tmt indicated by a broken line.

When, as shown in FIG. 5, the waveform of each of the magnetic flux densities of the U-, V-, and W-phases (U-phase magnetic flux density Bu, V-phase magnetic flux density Bv, and W-phase magnetic flux density Bw) is at a constant level (ideal value) during each 120-degree energization interval, if the actual motor torque Tmr is controlled to coincide with a given target motor torque Tmt, the waveform of each of the phase currents Iu, Iv, and Iw of the U-, V-, and W-phases may be at a constant level during the 120-degree energization interval.

Generally, however, the waveform of each of the magnetic flux densities of the U-, V-, and W-phases (U-phase magnetic flux density Bu, V-phase magnetic flux density Bv, and W-phase magnetic flux density Bw) is not at a constant level during each energization interval (each 120-degree interval in FIG. 5). For example, as shown in FIG. 7, a magnetic flux density waveform indicated by a broken line changes during each energization interval (each 120-degree interval in FIG. 7).

Figure 7:
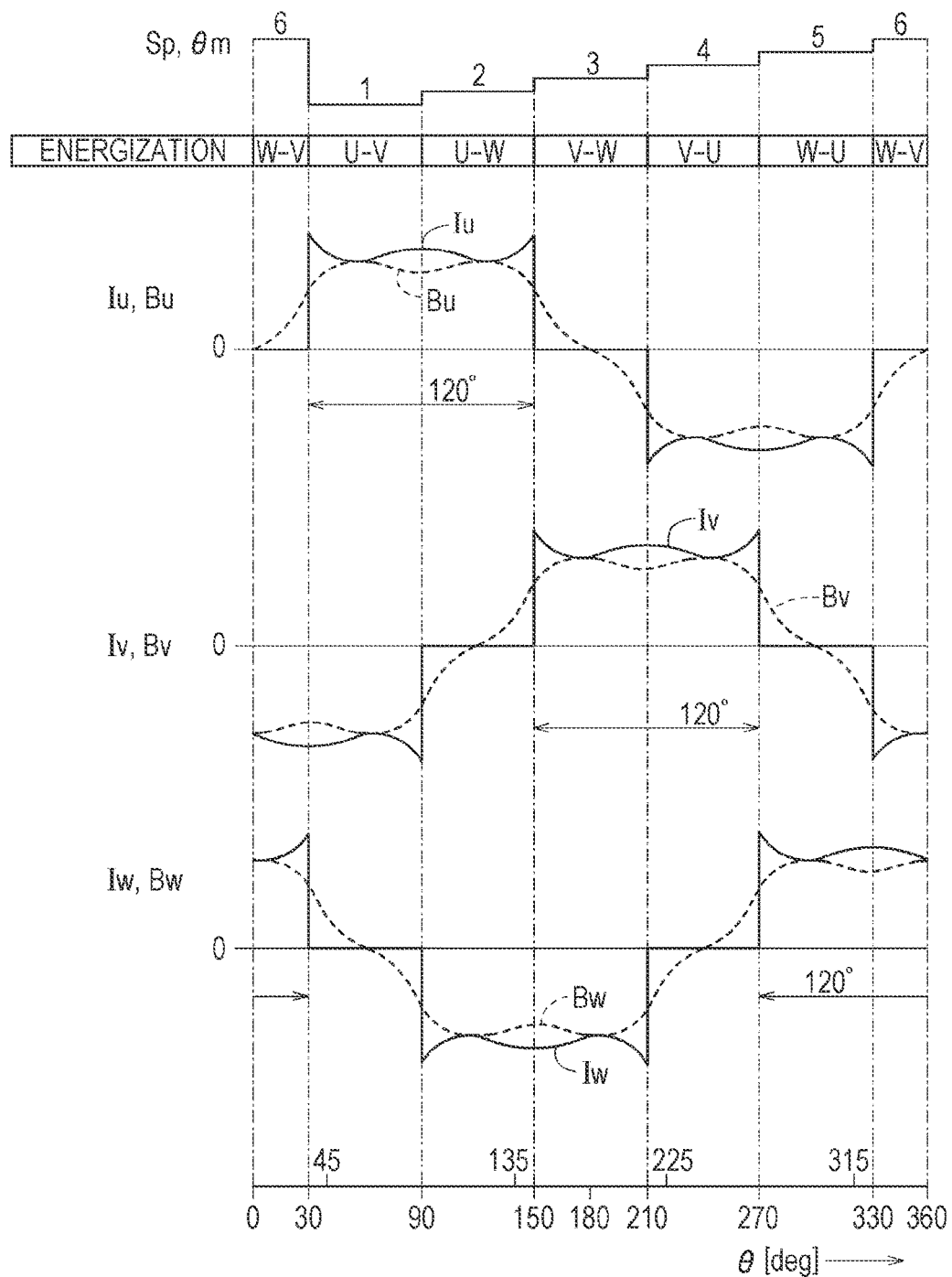
FIG. 7 is a timing diagram showing energization patterns of phase currents, where the level of each magnetic flux density waveform is not constant during an energization period.

In the example of FIG. 7, the amplitude of the waveform of each of the magnetic flux densities Bu, Bv, and Bw is reduced at the start, middle, and end points of each energization interval. However, since the ECU 40 controls the actual motor torque Tmr to coincide with a given (constant) target motor torque Tmt, the amplitude of the waveform of each of the phase currents Iu, Iv, and Iw of the U-, V-, and W-phases is controlled to increase at the start, middle, and end points of each 120-degree energization interval, that is, at the points where the corresponding one of the magnetic flux densities Bu, Bv, and Bw is reduced, as indicated by a solid waveform in FIG. 7.

The motor torque is proportional to the product of each of the phase currents Iu, Iv, and Iw of the U-, V-, and W-phases and the corresponding one of the magnetic flux densities Bu, Bv, and Bw of the U-, V-, and W-phases (e.g., Iu×Bu, Iv×Bv, and Iw×Bw). Therefore, if, as shown in FIG. 7, the amplitude of the waveform of each of the phase currents Iu, Iv, and Iw of the U-, V-, and W-phases is controlled to increase at the start, middle, and end points of each 120-degree energization interval where the corresponding one of the magnetic flux densities Bu, By, and Bw is reduced, it is possible to make the actual motor torque Tmr coincide with the target motor torque Tmt as shown in FIG. 6.

To be more general, even when the waveform of each of the magnetic flux densities Bu, By, and Bw is not constant and varies during each 120-degree energization interval as shown in FIG. 7, the ECU 40 changes the phase currents Iu, Iv, and Iw to compensate for the variations in the magnetic flux densities Bu, By, and Bw, so that the actual motor torque Tmr can be controlled to a constant value which coincides with a given target motor torque Tmt as shown in FIG. 6.

That is, even when the waveforms of the magnetic flux densities Bu, By, and Bw are distorted (magnetic flux distributions are distorted) due to variations in polarization of the permanent magnets (not shown) forming the magnetic poles of the rotor 28, or due to variations in magnetic permeability of the teeth (not shown) of the stator 26, a smooth (constant) output motor torque (actual motor torque Tmr), such as that shown in FIG. 6, can be obtained by controlling the phase currents Iu, Iv, and Iw for compensation so as to make the actual motor torque Tmr coincide with a given target motor torque Tmt.

Advantages of the brushless motor 10 of a 120-degree energization type, according to the first embodiment, will be described through a comparison with a brushless motor of a 180-degree energization type.

The 180-degree sinusoidal energization (sinusoidal drive) is a technique in which the rotor is rotated by continuously changing the voltage of coils of the stator in a sinusoidal manner, in accordance with the rotational angle of the rotor. The main purpose of this technique is to eliminate changes in motor torque by inputting sinusoidal voltages phase-shifted by 120 degrees to respective phases.

To achieve this purpose, it is necessary to manufacture a motor having a sinusoidal magnetic flux (and a sinusoidal induced voltage) and pass a sinusoidal current through the motor.

That is, to obtain a magnetic flux density waveform having a sinusoidal shape, it is necessary to design a complex stator teeth shape, cross-sectional shape of magnets, and polarization direction, and to perform vector control through the use of a high-speed high-performance microcomputer on the basis of angles detected by a resolver (e.g., continuous quantities with one degree intervals) for passing a sinusoidal current.

Once a stator and a rotor having magnets are designed for their use, there is no significant difference in the cost of manufacture between the 180-degree energization type and the 120-degree energization type when brushless motors are produced in large quantities. However, using a resolver and a high-speed high-performance microcomputer that performs vector control increases the cost of manufacture.

A brushless motor of the 120-degree energization type is advantageous in terms of lower cost, because its phases only need to be managed at 60-degree intervals. However, it has been difficult to reduce changes in motor torque.

Theoretically, it is only necessary to manufacture a motor that generates a rectangular magnetic flux, and then to pass a rectangular current. However, manufacturing a motor that generates an accurate rectangular (or trapezoidal) magnetic flux is more difficult than manufacturing a motor that generates a sinusoidal magnetic flux. It is also difficult to pass a rectangular current for ON and OFF energization at intervals of 120 degrees.

In the brushless motor 10 of the 120-degree energization type according to the first embodiment, it is possible, without detecting the phase current Ip, to eliminate changes in the actual motor torque Tmr by varying the magnitude of the phase current Ip, through feedback control, such that the actual motor torque Tmr coincides with the target motor torque Tmt. Additionally, it is possible to control the actual motor torque Tmr to be constant, without designing the stator or magnets in such a way that a rectangular magnetic flux is generated.

Second Embodiment

Figure 8:
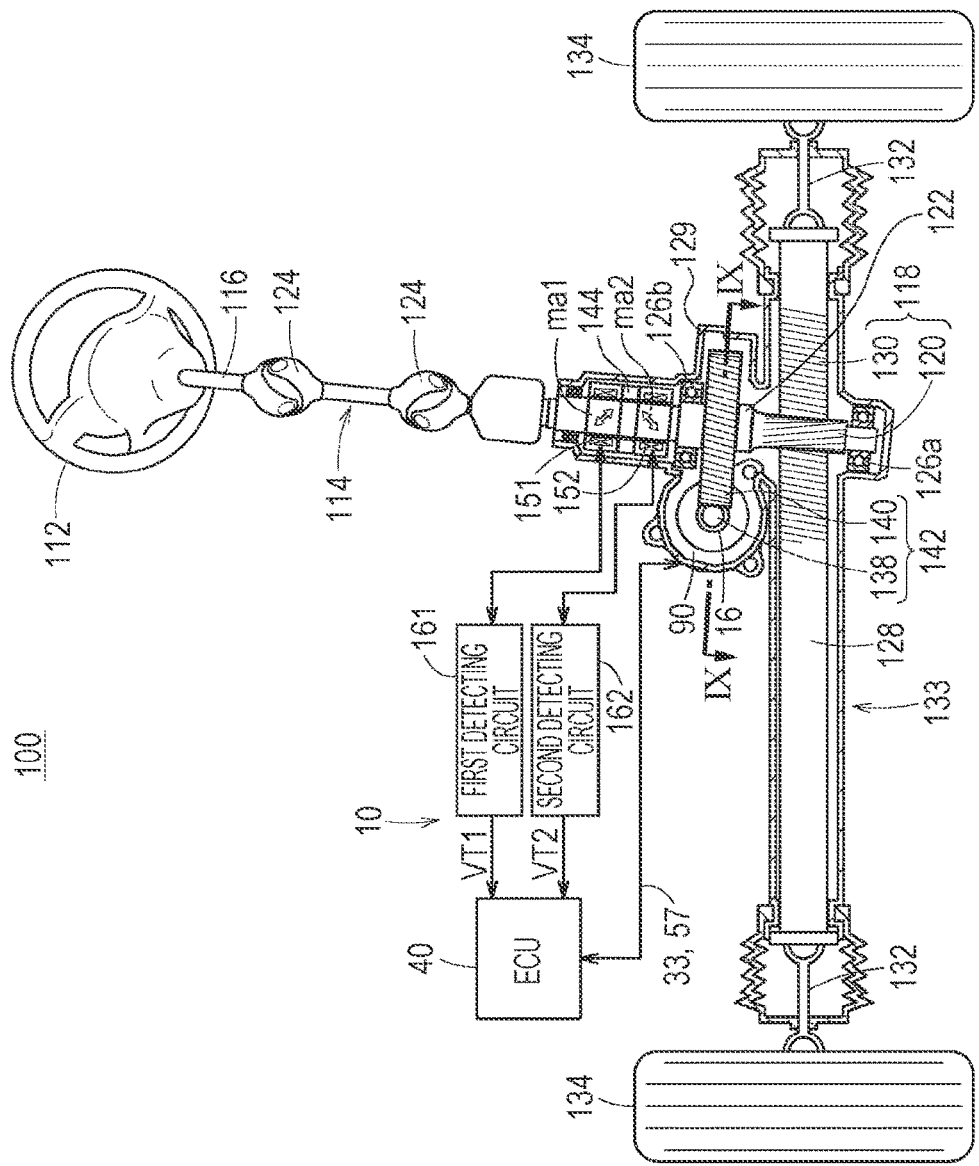
FIG. 8 schematically illustrates a configuration of an electric power steering apparatus according to a second embodiment.
Figure 9:
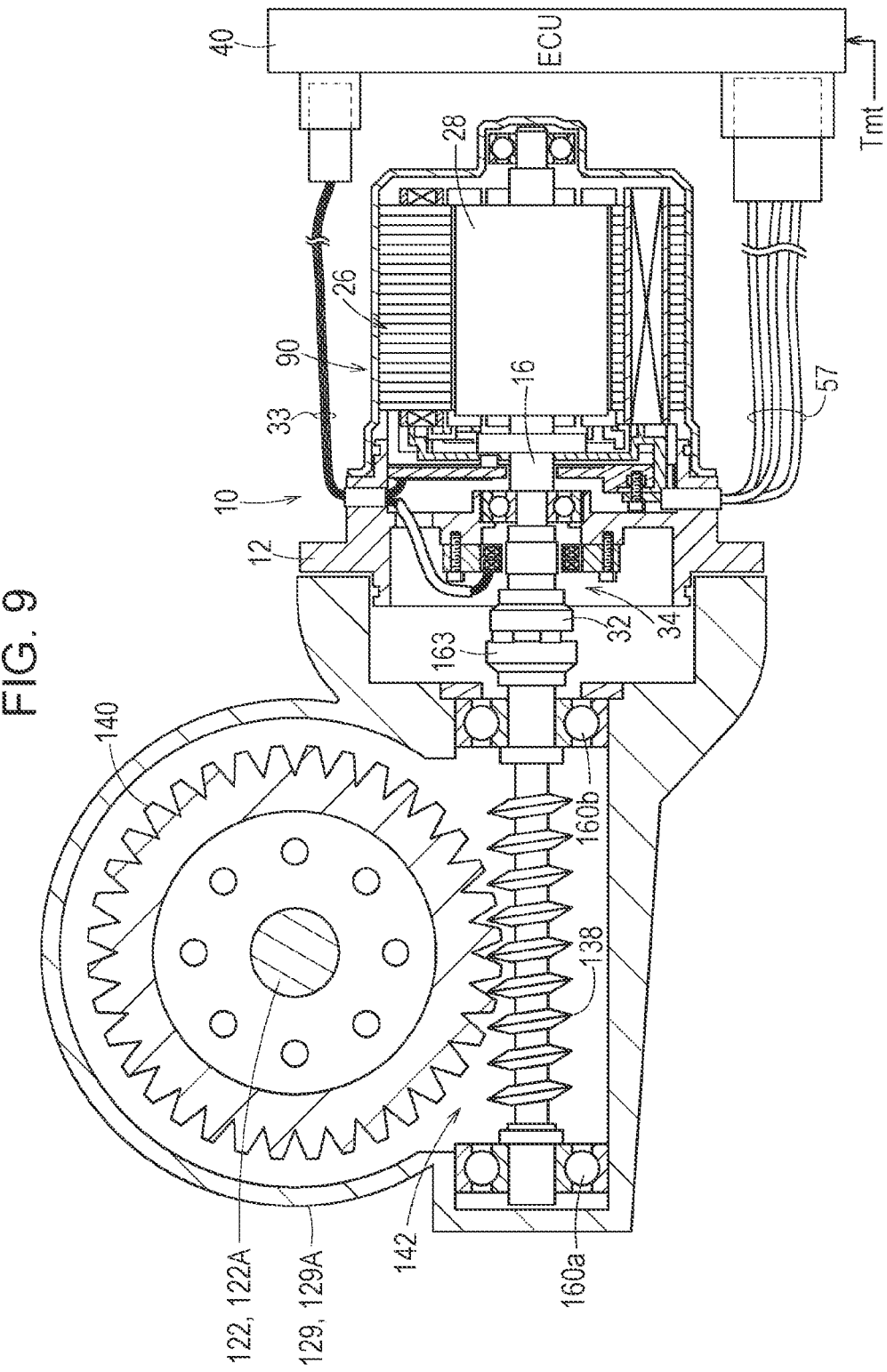
FIG. 9 is a cross-sectional view taken along line IX-IX of the electric power steering apparatus illustrated in FIG. 8.

FIG. 8 schematically illustrates a configuration of an electric power steering apparatus 100 according to a second embodiment. FIG. 9 is a cross-sectional view taken along line IX-IX of the electric power steering apparatus 100 illustrated in FIG. 8.

The electric power steering apparatus 100 includes the brushless motor 10 illustrated in FIG. 1.

For simplicity and easier understanding, components in FIGS. 8 and 9 that are the same as, or correspond to, those illustrated in FIGS. 1 to 7 are identified by the same reference numerals, and their detailed description will be omitted. The description will also refer to FIGS. 1 to 7 as necessary.

As illustrated in FIG. 8, the electric power steering apparatus 100 includes a steering shaft 114 coupled to a steering handle 112. The steering shaft 114 is formed by coupling a main steering shaft 116 to a pinion shaft 122 through universal joints 124. The main steering shaft 116 is integrally coupled to the steering handle 112. The pinion shaft 122 is provided with a pinion gear 120 of a rack-and-pinion mechanism 118.

The pinion shaft 122 is supported at its lower and middle portions by bearings 126a and 126b, respectively, attached to a gear housing 129. The pinion gear 120 is provided at a lower end portion of the pinion shaft 122. The pinion gear 120 engages with a rack gear 130 on a rack shaft 128 capable of reciprocating in the vehicle width direction. Right and left front wheels 134 serving as turning wheels are coupled, through respective tie rods 132, to both ends of the rack shaft 128.

This configuration allows a normal rack-and-pinion turning operation during operation of the steering handle 112, and allows the front wheels 134 to turn to change the direction of the vehicle. The rack shaft 128, the rack gear 130, and the tie rods 132 form a turning mechanism 133.

The turning mechanism 133, the steering shaft 114 (including the main steering shaft 116 and the steering handle 112 provided with the pinion gear 120 of the rack-and-pinion mechanism 118, which are coupled to each other by the universal joint 124), and the steering handle 112 form a steering system.

The electric power steering apparatus 100 also includes the motor 90 for steering assist. Specifically, the motor 90 supplies an auxiliary steering force to the pinion shaft 122 to reduce a steering force required to be applied to the steering handle 112.

As illustrated in FIG. 9, a worm gear 138 is supported by bearings 160a and 160b attached to the gear housing 129, and the shaft of the worm gear 138 is coupled, through joints 163 and 32 (see also FIG. 1), to the rotating shaft 16 of the motor 90.

The worm gear 138 rotating integrally with the rotating shaft 16 of the motor 90 engages with a worm wheel gear 140 on the pinion shaft 122. The worm gear 138 and the worm wheel gear 140 form a speed reducing mechanism 142. The speed reducing mechanism 142 smoothly converts a rotational driving force of the motor 90 to a rotational driving force of the pinion shaft 122 at a given boosting ratio.

As illustrated in FIG. 8, a known magnetostrictive torque sensor 144 is provided in an upper part of the pinion shaft 122. The magnetostrictive torque sensor 144 detects a torque of the pinion shaft 122 (steering shaft 114) on the basis of a change in magnetic characteristic caused by magnetostriction, that is, a change in magnetic characteristic caused by an inverse magnetostriction effect.

A first anisotropy ma1 and a second anisotropy ma2 of different orientations are given to the pinion shaft 122. The magnetostrictive torque sensor 144 is provided with a first detecting coil 151 and a second detecting coil 152 for the first anisotropy ma1 and the second anisotropy ma2, respectively.

The outputs of the first and second detecting coils 151 and 152 are supplied, through a first detecting circuit 161 and a second detecting circuit 162 each having a differential amplifier, as an output voltage VT1 and an output voltage VT2 to the ECU 40.

The ECU 40 calculates a steering torque signal VT3 from a difference between the output voltage VT1 and the output voltage VT2.

Besides the steering torque signal VT3, the ECU 40 calculates the target motor torque Tmt for generating power in the motor 90, on the basis of a vehicle speed signal and a motor rotation signal (not shown). As illustrated in FIG. 9, the target motor torque Tmt may be generated by another ECU.

As described with reference to FIG. 4, the ECU 40 generates, on the basis of the target motor torque Tmt, the gate drive signals Sg1 to Sg6 which are drive voltages (PWM signals) for energizing the motor 90. At the same time, the ECU 40 performs proportional-integral (PI) control such that the actual motor torque Tmr, which is actually generated on the rotating shaft 16 of the motor 90 and detected by the torque sensor 34, coincides with the target motor torque Tmt to generate power in the motor 90.

The power of the motor 90 is transmitted, through the speed reducing mechanism 142 (including the worm gear 138 and the worm wheel gear 140) on the pinion shaft 122, to the steering shaft 114 (see FIG. 8) to reduce the driver's steering load.

REVIEW OF EMBODIMENTS, AND MODIFICATION

The brushless motor 10 of the first embodiment described with reference to FIGS. 1 to 7 includes the rotor 28 rotating integrally with the rotating shaft 16 and having a plurality of permanent magnets circumferentially arranged to serve as magnetic poles, and the stator 26 having the phase coils 20 arranged to face the rotor 28 with a gap therebetween.

The brushless motor 10 includes the rotational phase sensor 50 configured to detect, as the rotational phase θm, the rotational position of a magnetic pole of one of the permanent magnets in accordance with the rotation of the rotor 28, detect the rotational phase θm stepwise every predetermined rotational phase (every 60 degrees in electrical angle in the above-described embodiments) corresponding to a stepwise change (increase or decrease) in the rotational phase θm, and to generate the energization phase signal Sp which uniformly changes its output every 60 degrees in electrical angle θ; the torque sensor 34 attached to the rotating shaft 16 and configured to detect the actual motor torque Tmr; and the ECU 40 serving as a motor controller configured to pass the phase currents Ip to the respective phase coils 20.

On the basis of the energization phase signal Sp that uniformly changes its output every predetermined rotational phase (every 60 degrees in electrical angle in the above-described embodiments), the ECU 40 switches the phase current Ip (Iu, Iv, or Iw) passing through the corresponding phase coil 20, and changes the magnitude of the phase current Ip passing through the phase coil 20 such that the actual motor torque Tmr detected by the torque sensor 34 coincides with the target motor torque Tmt.

Thus, to control the motor torque such that the actual motor torque Tmr coincides with the target motor torque Tmt, the ECU 40 changes the magnitude of the phase current Ip (Iu, Iv, or Iw) passing through the corresponding phase coil 20. Therefore, the brushless motor 10 can be provided, which is capable of reducing changes in motor torque with a simple and inexpensive configuration without requiring an expensive phase current sensor, which is necessary in the related art. Also, unlike the related art, the brushless motor 10 does not require, for example, a high-resolution phase current sensor with a complex configuration, which detects a continuous rotational phase (angle) that increases in increments of one degree. That is, it is only necessary that the rotational phase θm be detected discontinuously (stepwise) by the rotational phase sensor 50 with a simple configuration. This reduces the cost of the brushless motor 10 and improves reliability of the brushless motor 10.

When the phase coils 20 are three phase coils, the U-phase coil 20u, the V-phase coil 20v, and the W-phase coil 20w, then the ECU 40 passes the phase current Ip sequentially through pairs of phase coils 20, that is, the U- and V-phase coils 20u and 20v, the U- and W-phase coils 20u and 20w, the V- and W-phase coils 20v and 20w, the V- and U-phase coils 20v and 20u, the W- and U-phase coils 20w and 20u, and the W- and V-phase coils 20w and 20v while changing the phase in each 120-degree energization range on the basis of the energization phase signal Sp. This simplifies the control operation and the circuit configuration of the three-phase bridge drive circuit 74, which is a control circuit.

A waveform showing changes in each of the magnetic flux densities Bu, Bv, and Bw of the permanent magnets during half a period, including the 120-degree energization range of each phase current Ip, may not be a rectangular waveform or a sinusoidal waveform, and may be a substantially trapezoidal waveform with rounded corners, as shown in FIG. 7. In this case, the stator and the rotor do not require a complex configuration for generating sinusoidal or rectangular changes in magnetic flux density, and there is no need for detailed design for obtaining such a complex configuration. Therefore, the brushless motor 10 can be manufactured in low cost and shorter development time.

Since the torque sensor 34 is formed by a magnetostrictive torque sensor, it is possible to improve torsional rigidity of a drive system including the rotating shaft 16, make the drive system less prone to torsional resonance, and extend the frequency response of drive control to high frequencies.

The rotational phase sensor 50 includes the sensor magnet 52 serving as a rotating member, and the detector 54 including three detecting elements 54a, 54b, and 54c. The sensor magnet 52 rotates integrally with the rotating shaft 16, and includes the sensor permanent magnets 60 circumferentially arranged to correspond to respective positions of the magnetic poles (in the above-described embodiments, six sensor permanent magnets 60 are arranged such that the north and south poles alternate every 60 degrees). The detector 54 is secured in place to face the sensor magnet 52, and is configured to detect changes in rotation of the sensor magnet 52.

With this simple configuration, the rotational phase sensor 50 can detect the rotational phase θm stepwise every 60 degrees in electrical angle, and can output the energization phase signal Sp that changes its output value every 60 degrees in electrical angle.

The sensor magnet 52 may not be provided, and the detector 54 including the detecting elements 54a, 54b, and 54c may be configured to detect the rotational phase θm as the six magnetic poles (permanent magnets) of the rotor 28 revolve.

The rotational phase sensor 50 may include either of a Hall element sensor and a magnetoresistive element sensor, which are magnetic sensors capable of detecting magnetic fields of the revolving sensor permanent magnets 60. This eliminates the need for an expensive, high-precision rotational angle sensor with a complex configuration, such as a magnetic resolver or an optical rotary encoder.

In the case of adopting two-phase energization in which two out of three phase coils are energized in each 120-degree energization range, either the Hall element sensor or the magnetoresistive element sensor can detect changes in the rotational phase θm with a sufficiently high precision, such as every 60 degrees in the embodiments described above.

With the brushless motor 10 configured as described above, the electric power steering apparatus 100 (see FIGS. 8 and 9) can achieve simple drive control, low cost, and high performance.

FIG. 10 schematically illustrates a configuration of an electric power steering apparatus 100A obtained by modifying the electric power steering apparatus 100 of the second embodiment.

The electric power steering apparatus 100A is an electric power steering apparatus of a so-called double pinion assist type. As compared to the electric power steering apparatus 100 illustrated in FIG. 8, the electric power steering apparatus 100A has a greater degree of freedom in mounting on a vehicle, and has a higher output.

In FIG. 10, components that are the same as, or correspond to, those illustrated in FIGS. 1 to 9 are identified by the same reference numerals, and their detailed description will be omitted.

In the electric power steering apparatus 100A, the speed reducing mechanism 142 is disengaged from the steering shaft 114 coupled to the steering handle 112, and is engaged with an auxiliary pinion shaft 122A.

The auxiliary pinion shaft 122A is supported at its lower and upper portions by bearings 126c and 126d, respectively, attached to an auxiliary gear housing 129A. An auxiliary pinion gear 120A is provided in the lower part of the auxiliary pinion shaft 122A. The auxiliary pinion gear 120A engages with another rack gear 130A on the rack shaft 128 capable of reciprocating in the vehicle width direction.

The auxiliary pinion gear 120A and the rack gear 130A form an auxiliary rack-and-pinion mechanism 118A.

The electric power steering apparatus 100A includes the motor 90 for steering assist. Specifically, the motor 90 supplies an auxiliary steering force to the auxiliary pinion shaft 122A to reduce a steering force required to be applied to the steering handle 112.

As illustrated in FIG. 9, the worm gear 138 is supported by bearings 160a and 160b attached to the auxiliary gear housing 129A, and the shaft of the worm gear 138 is coupled, through the joints 163 and 32, to the rotating shaft 16 of the motor 90.

The worm gear 138 rotating integrally with the rotating shaft 16 of the motor 90 engages with the worm wheel gear 140 on the auxiliary pinion shaft 122A. The worm gear 138 and the worm wheel gear 140 form the speed reducing mechanism 142. The speed reducing mechanism 142 smoothly converts a rotational driving force of the motor 90 to a rotational driving force of the auxiliary pinion shaft 122A at a given boosting ratio.

Besides the steering torque signal VT3 described above, the ECU 40 calculates the target motor torque Tmt for generating power in the motor 90, on the basis of a vehicle speed signal and a motor rotation signal (not shown). As illustrated in FIG. 9, the target motor torque Tmt may be generated by another ECU.

As described with reference to FIG. 4, the ECU 40 generates, on the basis of the target motor torque Tmt, the gate drive signals Sg1 to Sg6 which are drive voltages (PWM signals) for energizing the motor 90. At the same time, the ECU 40 performs proportional-integral (PI) control such that the actual motor torque Tmr, which is actually generated on the rotating shaft 16 of the motor 90 and detected by the torque sensor 34, coincides with the target motor torque Tmt to generate power in the motor 90.

The power of the motor 90 is transmitted, through the speed reducing mechanism 142 (including the worm gear 138 and the worm wheel gear 140) on the auxiliary pinion shaft 122A and the auxiliary rack-and-pinion mechanism 118A, to the steering shaft 114 to reduce the driver's steering load.

In the electric power steering apparatus 100A configured as described above, on the basis of the energization phase signal Sp that uniformly changes its output every predetermined rotational phase (every 60 degrees in electrical angle in the above-described embodiments), the ECU 40 sequentially passes the phase current Ip (Iu, Iv, or Iw) through the corresponding phase coil 20 while switching the phase in each 120-degree energization range, and changes the magnitude of the phase current Ip passing through the corresponding phase coil 20 such that the actual motor torque Tmr detected by the torque sensor 34 coincides with the target motor torque Tmt.

It is to be understood that the present disclosure is not limited to the embodiments described above, and may have various configurations based on the description of the present specification. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A brushless motor comprising:
    a rotor rotating integrally with a rotating shaft and having a plurality of permanent magnets circumferentially arranged to serve as magnetic poles;
    a stator having a plurality of phase coils arranged to face the rotor with a gap therebetween;
    a rotational phase sensor configured to detect, as a rotational phase, a rotational position of a magnetic pole of one of the permanent magnets in accordance with the rotation of the rotor, and to generate an energization phase signal that changes an output thereof at every predetermined rotational phase, the predetermined rotational phase corresponding to a stepwise change in the rotational phase;
    a torque sensor attached to the rotating shaft and configured to detect an actual motor torque; and
    a motor controller configured to pass a phase current to the respective phase coils,
    wherein, on the basis of the energization phase signal that changes the output thereof at the every predetermined rotational phase, the motor controller switches the phase current passing through the respective phase coils, and changes the magnitude of the phase current passing through the respective phase coils such that the actual motor torque detected by the torque sensor coincides with a target motor torque,
    wherein when the phase coils are three phase coils of a U-phase coil, a V-phase coil, and a W-phase coil, the rotational phase sensor is configured to generate the energization phase signal that changes the output thereof at every 60 degrees in electrical angle, which is the predetermined rotational phase, the rotational phase sensor detects the rotational phase stepwise with a predetermined resolution in electrical angle, and the rotational phase sensor is configured to detect the rotational phase stepwise with a resolution of 60 degrees in electrical angle, and the motor controller passes the phase current sequentially through pairs of phase coils, the U- and V-phase coils, the U- and W-phase coils, the V- and W-phase coils, the V- and U-phase coils, the W- and U-phase coils, and the W- and V-phase coils while changing a phase of the phase current by a 120-degree energization range on the basis of the energization phase signal.

2. The brushless motor according to claim 1, wherein a waveform showing changes in magnetic flux density of the permanent magnets during half a period of phase, including the 120-degree energization range of each phase current, has a substantially trapezoidal waveform with rounded corners, not a rectangular waveform or a sinusoidal waveform.

3. The brushless motor according to claim 2, wherein the actual motor torque is a function of the magnetic flux density of the permanent magnets and the phase current, and the motor controller compensates variation in the magnetic flux density by changing the magnitude of the phase current.

4. The brushless motor according to claim 1, wherein the torque sensor is a magnetostrictive torque sensor.

5. The brushless motor according to claim 1, wherein the rotational phase sensor includes
- a rotating member configured to rotate integrally with the rotating shaft, the rotating member including a plurality of sensor permanent magnets circumferentially arranged to correspond to respective positions of the magnetic poles; and
- a magnetic detector fixed in place to face the rotating member, the magnetic detector being configured to detect changes in rotation of the sensor permanent magnets of the rotating member.

6. The brushless motor according to claim 1, wherein the rotational phase sensor includes a Hall element sensor or a magnetoresistive element sensor.

7. An electric power steering apparatus comprising the brushless motor according to claim 1.

8. The brushless motor according to claim 1, wherein the rotational phase sensor detects the rotational phase stepwise at the every predetermined rotational phase.

9. The brushless motor according to claim 1, wherein the motor controller changes timing of the phase current passing through the respective phase on the basis of the energization phase signal.

10. The brushless motor according to claim 1, wherein the rotational phase sensor includes an energization phase signal generator configured to convert a signal detected by each of a plurality of detectors to a binary output signal which indicates either positive output or negative output, and wherein the energization phase signal generator assigns weights to respective binary output signals which indicate positive output to generate weighted binary output signals such that different values of weights are assigned to different detectors, the energization phase signal generator sums the weighted binary output signals to generate a summed value, the energization phase signal generator converts the summed value to one of rotational phases by referring to predetermined relationship between each summed value and one of the rotational phases to generate the energization phase signal, output of the energization phase signal uniquely varies per the predetermined rotational phase which corresponds to stepwise change in the rotational phase.

11. The brushless motor according to claim 1, wherein the rotational phase sensor comprises a sensor magnet which is a rotating member rotating together with the rotating shaft, the sensor magnet having a ring shape and including six sensor permanent magnets disposed along a circumferential direction of the ring shape, the six sensor permanent magnets comprises three first magnets with north magnetic pole and three second magnets with south magnetic pole disposed along the circumferential direction alternately by every 60 degrees, wherein the rotational phase sensor comprises three detectors serving as magnetic detectors which detect rotational positions of the north magnetic pole and the south magnetic pole of the sensor magnet, the three detectors being fixed onto a substrate at respective positions 40 degrees apart from one another in circumferential direction, the substrate being attached to a motor housing.

* * * * *